(12) United States Patent
Choi

(10) Patent No.: US 8,139,290 B2
(45) Date of Patent: Mar. 20, 2012

(54) TWO-WAY MIRROR SCREEN SYSTEM FOR ADVERTISEMENT

(76) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 12/882,632

(22) Filed: Sep. 15, 2010

(65) Prior Publication Data

US 2011/0216405 A1  Sep. 8, 2011

(30) Foreign Application Priority Data

Mar. 5, 2010  (KR) .................. 10-2010-0019711

(51) Int. Cl.
*G03B 21/62* (2006.01)

(52) U.S. Cl. ........ 359/460; 359/443; 359/452; 359/453; 359/454; 359/459

(58) Field of Classification Search ........... 359/443–461
See application file for complete search history.

(56) References Cited

U.S. PATENT DOCUMENTS

| 4,076,398 | A  | * | 2/1978  | Galbraith ........................ 353/69 |
| 6,783,247 | B2 | * | 8/2004  | White .............................. 353/79 |
| 7,495,829 | B2 | * | 2/2009  | Peterson et al. ............... 359/459 |
| 2003/0095331 | A1 | * | 5/2003 | Bengoechea et al. ......... 359/494 |
| 2003/0174292 | A1 | * | 9/2003 | White .............................. 353/74 |
| 2005/0219473 | A1 | * | 10/2005 | Moriyama et al. .............. 353/79 |
| 2006/0012876 | A1 | * | 1/2006 | Choi .............................. 359/452 |
| 2008/0309997 | A1 | * | 12/2008 | Ushiro et al. ................... 359/15 |

* cited by examiner

*Primary Examiner* — Clayton E LaBalle
*Assistant Examiner* — Kevin Butler
(74) *Attorney, Agent, or Firm* — Bacon & Thomas, PLLC

(57) ABSTRACT

A two way mirror system usable for an advertisement device includes a half-mirror having a light transmission function and a reflection function. A logo plate in a shape of an engraving or pattern in relief or intaglio is provided on a front face thereof and a two way screen through which a rear projected image can be viewed from both a front and rear face is provided on a rear face thereof. A single advertising device thus provides a logo advertising using a logo plate and reflected outside light during the day and an image advertisement viewable outside during night time, with inside viewing with double the usual brightness of a reflecting screen.

2 Claims, 5 Drawing Sheets

TWO-WAY MIRROR SCREEN SYSTEM FOR ADVERTISEMENT

BACKGROUND OF THE INVENTION

1. Field of the Invention

The present invention relates to a two-way mirror screen system for an advertising device which may be used on a street glass or window.

2. Description of Related Art

Generally, referring to an image device which is arranged on a window, the image displayed on the window may be cloudy or dim during the day time due to bright sunshine reaching the window. Additionally, prior logo (display) devices are not recognizable at night without an illumination unit. In addition, when a transmission-type screen is used on a window or door, outside light impinges on the screen image and of the screen becomes cloudy or dim, resulting in difficulty in viewing the image.

Moreover, when prior art logo plate display units are installed on a window or door, the rear face of the logo plate blocks the view.

Referring to Korean Patent registration No. 10075334, U.S. Pat. No. 7,324,277, and Korean Patent Application No. 10-2008 0063249, which were filed by the present applicant, prior art screen configurations capable of being viewed from front-rear faces are disclosed wherein when the screen is installed on a window or door, outside light is transmitted onto a rear surface of the screen, and thus the screen image and a sign board on a surface of the screen are cloudy and the screen cannot be used during the day.

SUMMARY OF THE INVENTION

Accordingly, the present invention is intended to solve the aforementioned drawbacks of the prior art, and one object of the present invention is to provide a two-way mirror screen system which can be used regardless of daylight and night time conditions, and wherein the two-way screen may function as a reflective screen with the brightness of an image increased two-fold.

The two-way mirror screen according to the present invention can be used as logo unit on the outside with a logo pattern and through which outside light may be reflected from windows or glass for daytime viewing and as a reflective screen on the inside having twice the brightness of prior two-way screens or usual screens.

During night time, an image logo device on which an image is displayed is obtained on the outdoor side to increase dramatically the advertising effect and, at the same time, on the indoor side, the device functions as a two-way mirror screen which is twice as bright as prior art two-way screens.

Herein, "two-way reflection" according to the present invention refers to the logo shape or pattern on a front side of the device that functions as a reflection pattern during daytime and as a reflection screen on the rear side. During night time, a projected image on the rear screen may be partially transmitted to the inner or rear surface of the half mirror so that the rear side of the mirror screen functions as a reflection screen having a double brightness.

According to the present invention, the two-way mirror system is provided with a known two-way screen on a rear side thereof, a front side and rear side which can be viewed and a logo plate on a front side thereof, comprising a half mirror through which some light is transmitted and from which some light is reflected.

The logo plate is shaped in relief or intaglio (positive or negative), and when the logo plate is shaped in relief, the half-mirror is exposed to the edges of the logo plate, and when the logo plate is engraved in intaglio, the half-mirror is exposed to the inner face or pattern of the logo plate.

The half-mirror is configured such that aluminum is deposited on a part of transparent material such as glass or plastic wherein the deposition thickness is controlled to obtain a reflection rate and transmission of 50%, respectively; however, the rates are not limited to such values.

According to the present invention, the half-mirror is viewable from outside towards the inside such that when the outside is bright, a mirror function is performed and when the inside is bright, a transparent mirror function is performed so that the inside can be viewed.

That is, when the outside is dark, a bright image formed on the immediate rear face of the half-mirror can be viewed from the outside.

Additionally, light transmitted through the two way screen arranged on a rear face of the half-mirror is reflected on a rear surface of the half-mirror and returned to a surface of the two way screen and thus the two way screen is converted into a reflection screen with double the brightness.

Accordingly, the two way mirror system according to the present invention is used as a logo plate from which an image of a logo pattern is reflected during the daytime and as a logo advertising plate from which an image is emitted during night time, and further a rear surface thereof functions as a mirror screen which is twice as bright than the prior art screen. Meanwhile, a logo formed as a reflection from the mirror face looks elegant and preserves any intrinsic color of the logo.

DETAILED DESCRIPTION OF THE PREFERRED EMBODIMENTS

The preferred embodiments of a two-way mirror system for an advertisement according to the present invention will be described in detail referring to the accompanied drawings.

Figure 1A:
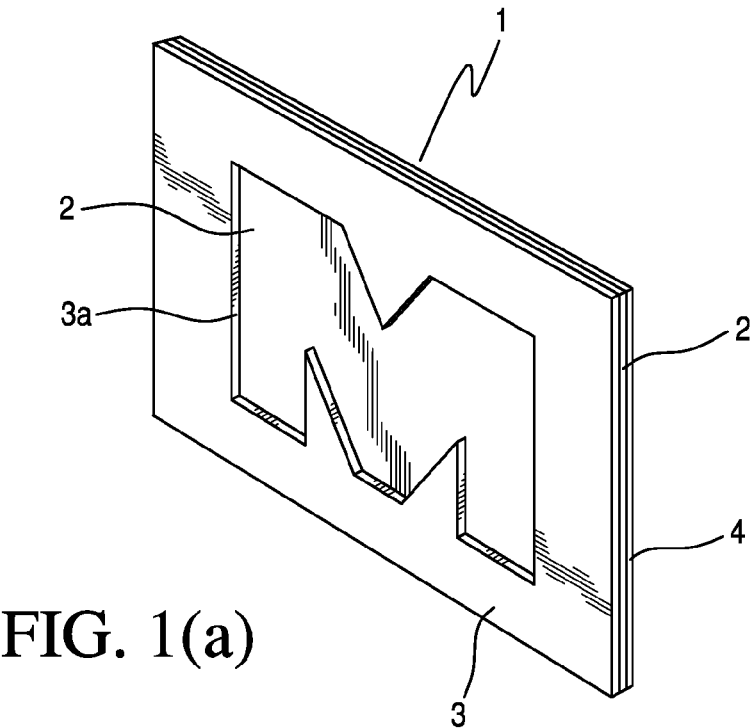
FIG. 1(a) shows schematically a front view of a two-way mirror screen system according to the present invention.
Figure 1B:
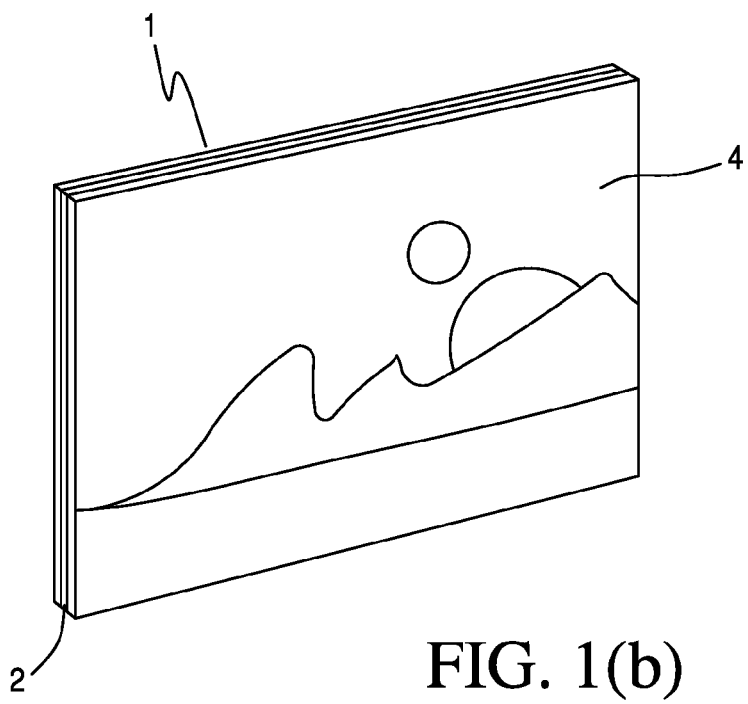
FIG. 1(b) shows schematically a rear view of a two-way mirror screen system according to the present invention.
Figure 2:
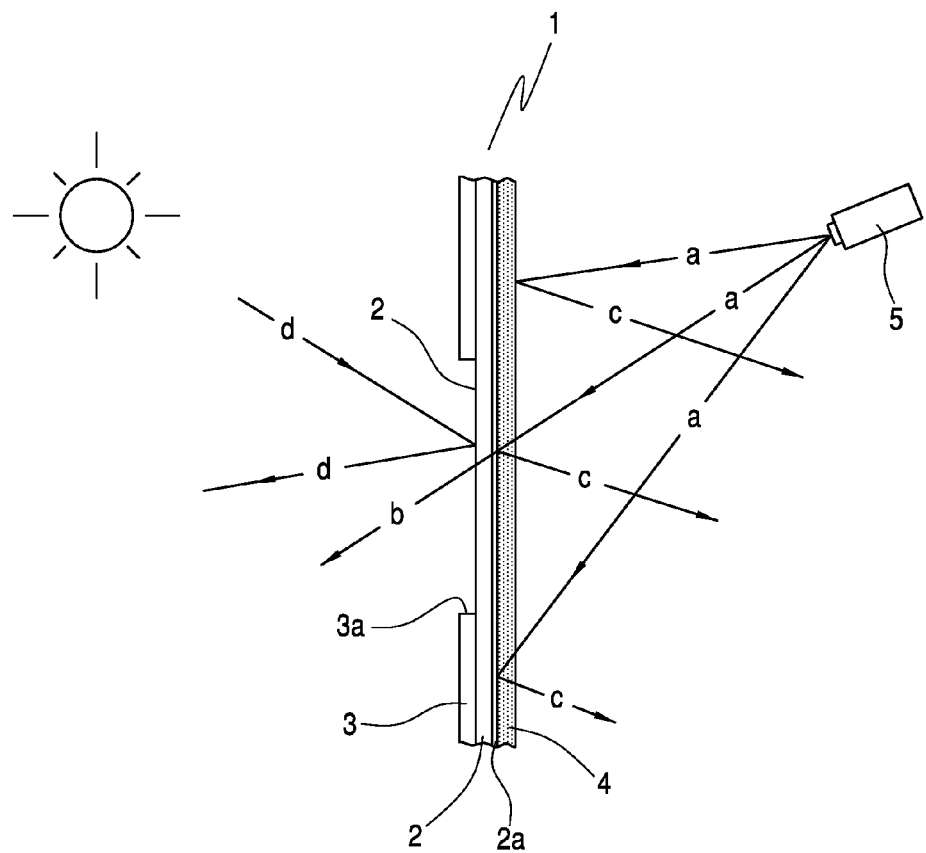
FIG. 2 shows schematically the operation of a half-mirror according to the present invention.

Referring to FIGS. 1 and 2, the two-way mirror system according to the present invention will be described.

First, the advertisement device 1 according to the present invention is featured such that, as shown in FIGS. 1(a) and 1(b), a logo plate 3 engraved (i.e., formed or shaped) in relief or intaglio (i.e., positive or negative) is arranged on a front face, located on a half-mirror 2, and a two-way screen 4 to be viewed both from the front side and rear side is arranged on a rear face of the half-mirror.

As shown in FIG. 2, the half-mirror 2 is configured such that one side of a transparent glass or plastic is provided with reflection material such as aluminum so that the transmission rate or reflection rate may be controlled, if necessary, such as a transmission rate of 50% and a reflection rate of 50%.

Additionally, the two-way screen structure 4 is viewable from both sides, i.e., from the front face and the rear face of the mirror system, through a plastic member inner face, the surface of which is applied with, contains, or is surface-embossed with silica, which is attached to the rear surface of the half-mirror 2.

FIG. 1(a) shows a front side of the two-way mirror system according to the present invention. As shown in FIG. 1(a), on a front side of the half-mirror 2, a logo plate 3 on which various advertisement characters or designs (patterns) are formed is provided as a negative. This logo plate 3 is formed such that the half-mirror 2 not covered is exposed and reflects the pattern outline.

FIG. 1(b) shows a rear side of the two-way mirror according to the present invention. As shown in FIG. 1(b), the two-way screen 4 is provided on a rear face of the half-mirror 2. Depending on the location of the system, the transmission rate and reflection rate of the half-mirror can be controlled more or less based on 50% each. For example, in case of an indoor installment, a transmission rate of 20% and reflection rate of 80% may be selected.

Figure 3:
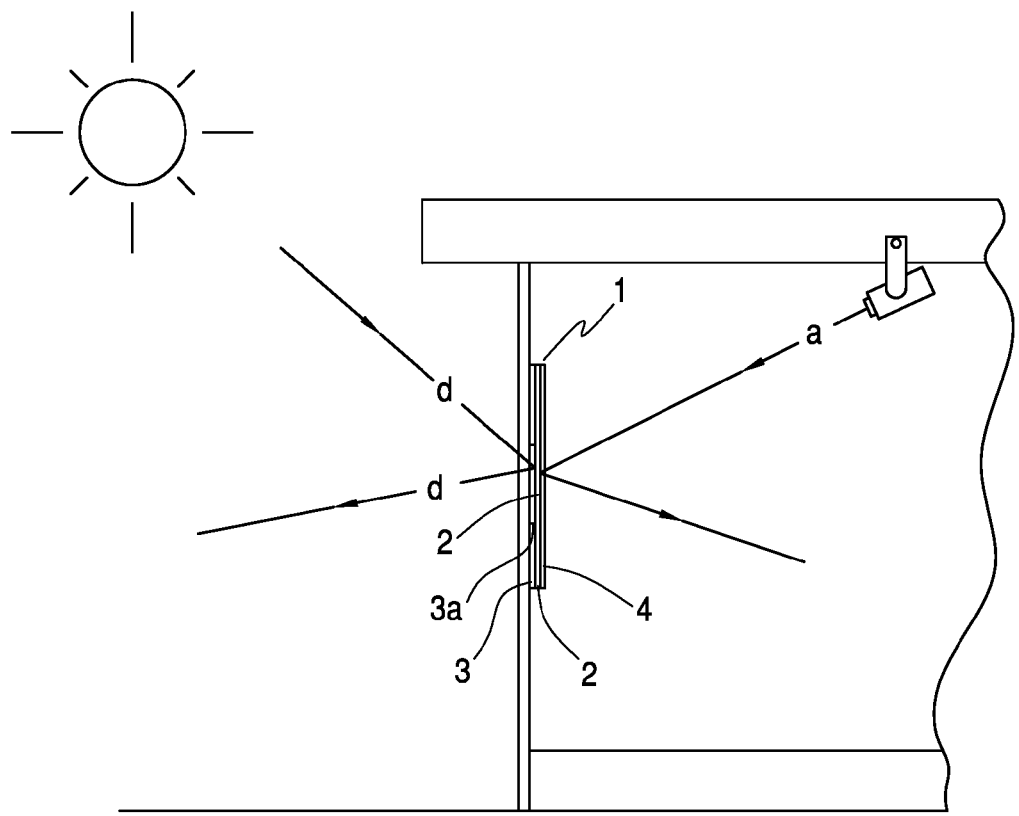
FIG. 3 shows schematically the two way mirror system when it is used during daytime.
Figure 4:
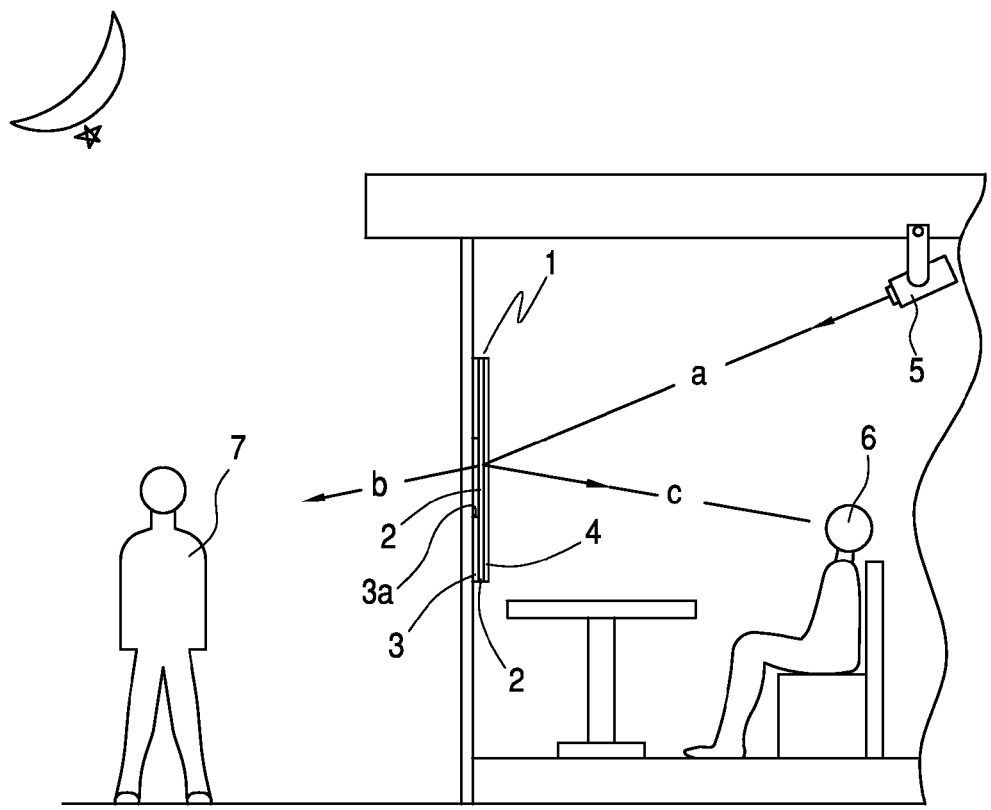
FIG. 4 shows schematically the two way mirror system when it is used during night time.

Referring to FIGS. 3 and 4, operation of the present invention will be described.

As shown in FIGS. 3 and 4, a projected image A from a projector 5 arranged on a rear side of the advertising device 1 is transmitted to the two-way screen 4 and then is partly reflected from the reflection layer 2a and converted into a reflection image C which can be viewed by an indoor viewer 6 in the manner of a reflection screen. Simultaneously, a part B of the image on the two-way screen 4 is transmitted through the screen 4. The transmitted image B is reflected from the half-mirror 2 and overlaps the reflected image from the face of the two-way screen 4 to double the brightness thereof. Also, the transmitted part B is viewable from the front side of the advertising device 4 via the half-mirror.

As shown in FIG. 3, outdoor light D is reflected from the half-mirror 2 which displays the logo pattern 3a of logo plate 3 so that, as shown in FIG. 4, even in bright light, logo plate patterns or characters illuminated by outdoor light are reflected to outdoor viewers on the front side and thus the logo plate can be viewed clearly during the daytime.

As shown in FIG. 4, the half-mirror 2 functions such that when the outside is dark, the image on the two-way screen 4 on the rear face of the half-mirror 2 is transmitted to the half-mirror 2 to be viewed brightly and thus an outside viewer 7 can see the image formed of the half-mirror 2 itself as a shape of the logo pattern or character. At the same time, inside viewer 6 can see the reflected image on the two-way screen twice as bright as compared to the prior art device due to the double reflection.

Figure 5:
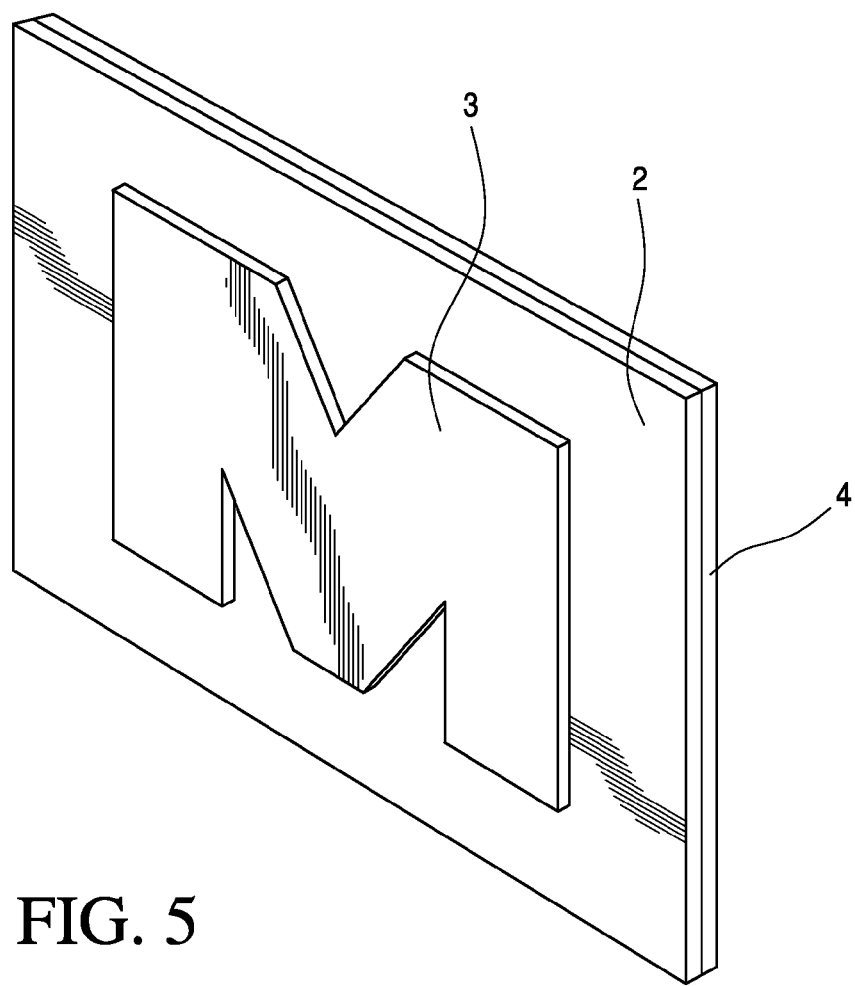
FIG. 5 shows schematically a logo plate formed in relief.

Alternatively, as shown in FIG. 5, when the logo plate 3 is shaped in positive form, the half-mirror 2 is adjacent to the peripheral edge of the logo plate 3 and thus logo pattern or character can be relatively clear or various colors can be used for the logo plate. Here, the logo plate 3 can be configured such that logo shape can be printed on a surface of the half-mirror 2. Additionally, referring to the half-mirror 2 which is exposed to the periphery to the logo plate 3, an image projected on a rear surface thereof is displayed at night and thus the advertising effect can be enhanced.

Accordingly, according to the present invention, during daytime a clear logo plate reflected through outside light is displayed outside and at the same time a double bright mirror screen is displayed indoors through a single advertising device 1. Further, during night time, a mobile image logo plate through which a mobile image is transmitted to a logo inner face 3a of the logo plate 3 is displayed and at the same time a double bright mirror screen can be displayed on the inside.

Additionally, a rear surface of the two-way screen 4 functions as a reflective screen which is doubly bright compared to prior art two-way screens through the use of the reflection function of the half-mirror 2 and thus advertising effects can be increased highly using the mirror screen.

Accordingly, this advertising device can be applied not only to a glass or window but also used as an advertising unit inside a shopping mall or an advertising unit inside a subway building.

While the present invention is described referring to the preferred embodiment, the present invention is not limited thereto, and thus various variation and modification can be made without departing from a scope of the present invention.

What is claimed is:

1. A two-way mirror system for an advertising device, the device having a front side and a rear side, and which is capable of displaying in bright light a logo pattern from the front side thereof or a rear projected image from both the front side and rear side thereof, comprising:
   a half-mirror having a front surface and a rear surface and configured to partially transmit and partially reflect light;
   a logo element having a logo pattern provided on the front surface of the half-mirror so that the half-mirror reflects the outline of the logo pattern;
   a two-way screen disposed on the rear surface of the half-mirror through which an image projected on the two-way screen is partially transmitted to the rear surface of the half-mirror and from which such image is partially reflected so that the image is doubly reflected, and the image is viewable from the front side and the rear side of the advertising device,
   wherein the front side of the advertising device is configured so that during daytime or in bright light the outline of the logo pattern is reflected by the half-mirror and during night time or in low light the image as transmitted through the half-mirror is viewable from the front side of the advertising device through the half-mirror with the outline of the logo pattern, and the rear side of the advertising device is configured so that the double reflected image is viewable on the two-way screen with increased brightness due to the double reflection of the image.

2. The two-way mirror system for an advertising device according to claim 1, wherein the logo pattern is a solid or positive form, so that the half-mirror reflects the peripheral outline of the pattern and a transmitted image surrounds the pattern.

* * * * *